United States Patent
Stute et al.

(10) Patent No.: US 9,172,595 B2
(45) Date of Patent: Oct. 27, 2015

(54) SYSTEMS AND METHODS OF PACKET OBJECT DATABASE MANAGEMENT

(75) Inventors: Michael Roy Stute, Plano, TX (US); Ary Paul Turner, Mesquite, TX (US)

(73) Assignee: Masergy Communications, Inc., Plano, TX (US)

( * ) Notice: Subject to any disclaimer, the term of this patent is extended or adjusted under 35 U.S.C. 154(b) by 1427 days.

(21) Appl. No.: 12/350,200

(22) Filed: Jan. 7, 2009

(65) Prior Publication Data

US 2009/0177765 A1  Jul. 9, 2009

Related U.S. Application Data

(60) Provisional application No. 61/019,529, filed on Jan. 7, 2008.

(51) Int. Cl.
*G06F 7/00* (2006.01)
*G06F 17/00* (2006.01)
*H04L 12/24* (2006.01)
*G06F 17/30* (2006.01)

(52) U.S. Cl.
CPC ........ *H04L 41/024* (2013.01); *G06F 17/30607* (2013.01); *H04L 41/0233* (2013.01)

(58) Field of Classification Search
CPC .................. G06F 17/30607; H04L 41/0233; H04L 41/024
See application file for complete search history.

(56) References Cited

U.S. PATENT DOCUMENTS

| | | | | |
|---|---|---|---|---|
| 5,937,168 | A * | 8/1999 | Anderson et al. | 1/1 |
| 6,473,400 | B1 * | 10/2002 | Manning | 370/229 |
| 6,483,804 | B1 * | 11/2002 | Muller et al. | 370/230 |
| 6,687,732 | B1 * | 2/2004 | Bector et al. | 709/200 |
| 6,952,824 | B1 * | 10/2005 | Hooper et al. | 718/100 |
| 7,376,125 | B1 * | 5/2008 | Hussain et al. | 370/352 |
| 2002/0051448 | A1 * | 5/2002 | Kalkunte et al. | 370/389 |
| 2005/0018618 | A1 * | 1/2005 | Mualem et al. | 370/252 |
| 2005/0265340 | A1 * | 12/2005 | Wu et al. | 370/389 |
| 2006/0218373 | A1 * | 9/2006 | Plondke et al. | 711/220 |
| 2007/0011321 | A1 * | 1/2007 | Huntington et al. | 709/224 |

OTHER PUBLICATIONS

Unesco and NYU, The Ip Datagram Structure, 08/23/200, pp. 1-8.*

* cited by examiner

*Primary Examiner* — Taelor Kim
(74) *Attorney, Agent, or Firm* — McGuireWoods LLP

(57) ABSTRACT

The present disclosure generally provides systems and methods of packet object database management. The database management system includes a database server designed specifically to process binary network packet data. The database server is associated with a parser, query engine, retrieval engine, virtual machine, data manger, and file processor. The database management system uses a proprietary query language to support all accesses to the database. The parser identifies whether the query is a data management query or if it is a data retrieval instruction. If the query is a data management query, the data manager manages the query request and attempts to satisfy the query request. Otherwise, query engine could further analyze or parse the query into a particular query structure or sub-structures to attempt to satisfy the query request.

11 Claims, 2 Drawing Sheets

SYSTEMS AND METHODS OF PACKET OBJECT DATABASE MANAGEMENT

CROSS REFERENCE TO RELATED APPLICATION

This application claims benefit under 35 U.S.C. §119(e) of U.S. Provisional Patent Application No. 61/019,529 filed on Jan. 7, 2008 in the United States Patent and Trademark Office entitled "Packet Object Database Management System." The entire disclosure of U.S. Provisional Patent Application No. 61/019,529 is incorporated by reference as if fully disclosed herein.

TECHNICAL FIELD

The present disclosure generally relates to information systems and, in particular, to systems and methods of managing databases associated with binary network packet data.

BACKGROUND

As the amount of data communicated through network packets increases, the ability to capture the data in a storage system and evaluate the large volume of data has become a long and burdensome process. As a result, companies are increasingly concerned about their ability to store and properly evaluate the amount of data generated from their networks outside of traditional time-consuming and costly processes.

There is therefore a need for systems and methods of efficiently and cost effectively providing a database management system for packet data.

SUMMARY

Embodiments of the present disclosure generally provide systems and methods of providing network security and threat management.

In one embodiment, the present disclosure could provide a system of managing packet data in a network. The system could include a virtual manager associated with a server. The virtual manager could parse incoming packet data according to a query type. The virtual manager could also associate an initial index with the packet data. The initial index could include information related to the source, the destination, and the time of arrival of the packet data. The system could also include a processing module to process the packet data according to the query type and the initial index.

In one embodiment, the present disclosure could provide a method of managing packet data in a network. The method could include parsing incoming packet data according to a query type. The method could also include initially indexing the packet data according to source related information, destination related information, and time related stamp related information associated with the packet data. The method could also include processing the packet data according to the query type and the initial indexing.

In one embodiment, the present disclosure could provide a database manager. The database manager could include a virtual manager associated with a server to parse incoming packet data according to a query type. The virtual manager could also associate an initial index with the packet data. The database manager could also include a processing module to process the packet data according to the query type and the initial index. The processing module could use the largest offset value associated with the information related to the source, the destination, or the time of arrival of the packet data to further index the packet data.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present disclosure generally provides systems and methods that reduce the execution time to search and process queries in large databases of static data while using minimum file storage or disk access.

Figure 1:
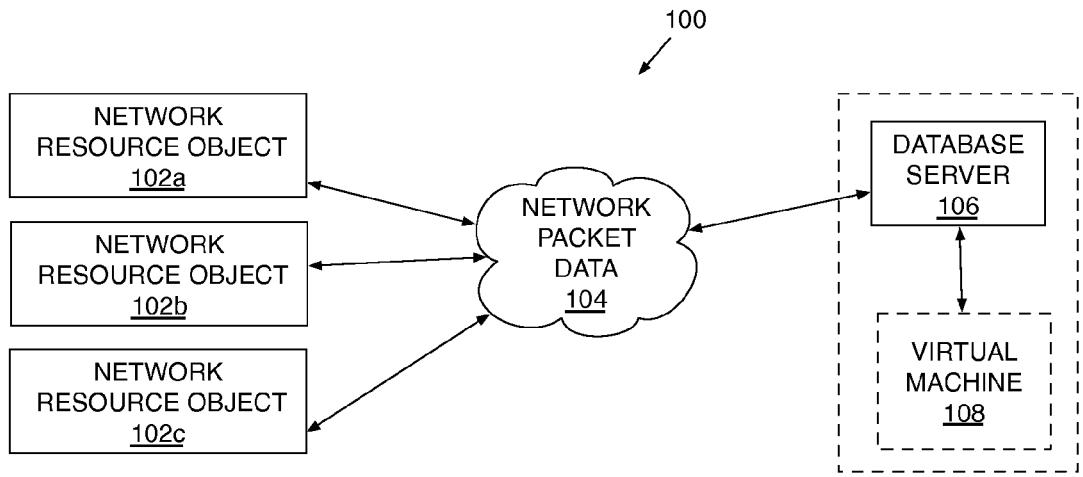
FIG. 1 is a simplified illustration an exemplary database management system according to one embodiment of the present disclosure.

FIG. 1 is a simplified illustration an exemplary database management system 100 according to one embodiment of the present disclosure. It should be understood that database management system 100 shown in FIG. 1 is for illustrative purposes only. Any other suitable system or subsystem could be used in conjunction with or in lieu of database management system 100, according to one embodiment of the present disclosure.

Database management system 100 could include one or more network resource objects 102a, 102b, and 102c (collectively referred to herein as network resource objects 102). Network resource objects 102 could, for example, generate network traffic to database server 106 and any other network device. In one embodiment, network resource objects 102 are configured to process data or otherwise output network packet data such as, for example, binary network packet data, to other parts of database management system 100.

It should be understood that network resource objects 102 could be any suitable object or group of objects to process any suitable type of data. For example, network resource objects 102 could include any suitable device including, for example, a server, user terminal, stand-alone unit, network device, database, module, application, software, scanner, printer, modem, facsimile machine, backup database, telephone system, router, Internet portal, Intranet portal, remote access portal, other suitable device, area, or database, or any combination thereof.

In one embodiment, network resource objects 102 could also be used to group certain devices by departments, management levels, users, employees, security clearances, priority levels, other suitable groups, or any combination thereof. For example, users belonging to a particular department, management group, security clearance group, or specialty within an enterprise could be grouped into one of "network resource objects" 102.

Database management system 100 could also include database server 106, virtual machine 108, and any suitable subsystems as later shown and described herein in conjunction with FIG. 2. It should be understood that although database server 106 and virtual machine 108 are shown as part of a unit, each could be a separate entity. Database server 106, virtual machine 108, or any other suitable system or subsystem could be used in conjunction with or in lieu of virtual machine 108. In addition, it should be understood that network packet data 104 could include any data capable of being transmitted from network resource objects 102 to database server 106. For example, network packet data 104 could include binary packet data.

Database server 106 could generally include any server, group of servers, databases, memories, applications, software, computer programs, routines, other objects, or any combinations thereof. In one embodiment, database server 106 is generally configured to receive and process network packet data 104, query requests, and output any data as necessary as later described in detail herein.

Virtual machine 108 could generally include any virtual object, server, group of servers, databases, memories, applications, software, computer programs, routines, other suitable objects, or any combinations thereof. In one embodiment, virtual machine 108 could be configured to process raw, network packet data such as, for example, binary packet data, from database server 106 as later described in detail herein.

In general, communications between network resource objects 102 and database server 106 could be transparent to the user. For example, such communications could be conducted using standard message objects over a brokered, load-balanced virtual circuit using an instance per process, rather than an instance per connection. In one embodiment, database management system 100 could use a transparent communications layer and requests are sent to database server 106 without first requiring a connection. Preferably, queries into a network associated with database server 106 are generally first built on the client side and then directed at database server 106.

Network resource objects 102, database server 106, and virtual machine 108 could be configured to communicate with other elements of database management system 100 with the aid of dedicated network connections, wire-line connections, wireless connections, other suitable communication links, or any combination thereof. For example, database server 106 could facilitate the processing of incoming queries and could provide output data as requested over the Internet or partly over the Internet.

When database management system 100 receives a query or network packet data 104, database server 106 could generally store each network packet data 104 in separate directories based on how the network packet data 104 was received. For example, in accordance with one embodiment of the present disclosure, if a particular sensor associated with the database management system 100 initially received the network packet data 104, then that network packet data 104 could be stored with other queries received from that sensor.

In one embodiment, after database management system 100 receives network packet data 104 or packages of network packet data 104, database server 106 and virtual machine 108 program could initially index that particular network packet data 104. For example, network packet data 104 could be indexed or otherwise named with the date and time of its creation. Database management system 100 could generally use these indices in a unique way to store, access, and process the associated package and does not necessarily require any other indices to do the same.

In one embodiment, when network packet data 104 is stored in database server 106, three indices could be created. The three indices could include one based on the Internet protocol (IP) address or other information related to the source, the second based on the IP address or other information related to the destination, and the third based on time stamp information associated with network packet data 104. Database server 106 and its subsystems shown in FIG. 2 could then process the indexed queries associated with network packet data 104 to satisfy the requested query.

Figure 2:
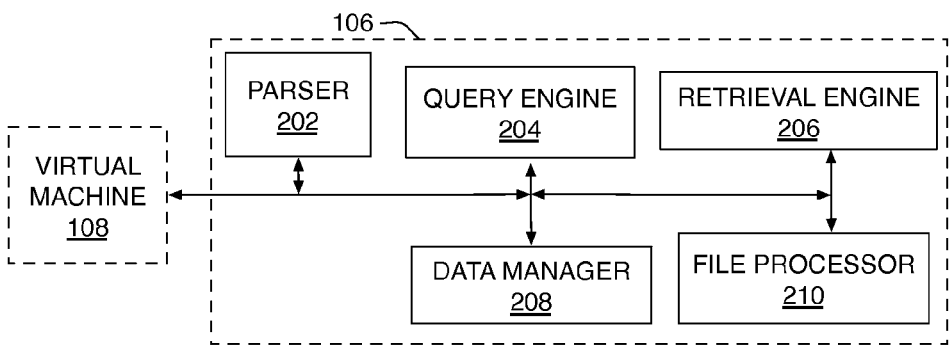
FIG. 2 is an exemplary illustration of subsystems associated with the database server shown in FIG. 1 according to one embodiment of the present disclosure.

FIG. 2 is an exemplary illustration of subsystems of database server 106 shown in FIG. 1 according to one embodiment of the present disclosure. It should be understood that database server 106 shown in FIG. 2 is for illustrative purposes only and that any other suitable system or subsystem could be used in conjunction with or in lieu of database server 106 or its subsystems according to one embodiment of the present disclosure.

Database server 106 could include certain subsystems or otherwise be associated with parser 202, query engine 204, retrieval engine 206, data manager 208, and file processor 210. Database management system 100 and database server 106 could also include application-programming interface (API) not shown in FIG. 2. Database server 106, parser 202, query engine 204, retrieval engine 206, data manager 208, file processor 210, API, and virtual machine 108 could communicate with each other with the aid of dedicated network connections, wire-line connections, wireless connections, other suitable communication links, or any combination thereof.

After database server 106 receives network packet data 104 or query from one of network resource objects 102, database server 106, and virtual machine 108 could initially index information associated with or related to the source, destination, and time stamp information associated with the query as described earlier in conjunction with FIG. 2. The native query information and the indexed values could be stored in or otherwise accessible from a storage device stored in or accessible by data manager 208. The indexing, thus, allows for efficient and relatively easy organizing, storing, and fast retrieval of data related to such queries.

The query could include a data retrieval request, a data management request, or other instruction in standardized retrieval language. The query could be passed to parser 202 for further processing and indexing. In one embodiment, parser 202 could generally convert the data retrieval request, data management request, or other instruction to, for example, a binary format, and then attempt to validate the data. For example, parser 202 could determine all possible indexes for a particular network data packet 104 to aid in organizing the storage and processing of that particular network data packet 104.

In one embodiment, parser 202 could index a particular network data packet 104 by using information associated with network data packet 104. Parser 202 could determine the largest offset in network data packet 104 possible to eventually bypass as much data as possible. For example, parser 202 could determine all source information, destination information, or time information from the query and examine network data packet 104. Parser 202 could then find the furthest point in network data packet 104 that contains all the data necessary to perform the query. The furthest point could be found by determining the file offset (in bytes of each data point) and selecting the largest possible offset that still meets all the requirements.

In addition, using proprietary query language, parser 202 could be configured to write and execute two general types of programs (e.g., an IP lookup program and an actual packet-processing program) depending on the type of query requested. For example, parser 202 could identify whether the query is a data management only query or if it contains query language requesting data retrieval. If the query is a data management only query, data manager 208 in one embodiment manages the query request and attempts to satisfy the query request. Otherwise, in one embodiment, query engine 204 could further analyze or parse the query into a particular data retrieval query structure or sub-structures to satisfy the query request.

In the first case, where the query involved is only a data management request, parser 202 could pass the query to data manager 208, which manages the process going forth. Data manager 208 could then analyze the query and request the retrieval engine 206 to create a qualifying file list that could satisfy the query using customized threads, routines, or other computer programs to specifically search for particular indices or types of data. The threads could request additional packet information to aid in populating the qualifying file list accordingly. In addition, the threads could correlate any input result sets to aid in populating the qualifying file list.

In one embodiment, data manager 208 could wait for the threads to terminate, assemble information related to each thread, and perform the data management request. For example, the data management request could include storage of new data, indexing of new data, removal of data that is no longer necessary, compression of data, decompression of data, generating a list of available data, caching data in fast access memory, or other data management routine.

In the second case, where the query involved is something other than a data management request such as for example, a data retrieval request, query engine 204 could analyze the proprietary query language to parse the query into appropriate query structures. Query engine 204 could generally take the formatted query or instruction and dispatch one or both to the required module for further processing. For example, query engine 204 could dispatch data management queries to data manager 208, while dispatching packet requests or queries to retrieval engine 206.

Retrieval engine 206 could, in turn, execute customized threads, routines, or other computer programs to specifically search for data to execute the requested query against. Retrieval engine 206 could generally receive a formatted data packet request or query and perform post-processing functions associated with the request or query. For example, retrieval engine 206 could request the appropriate data from data manager 208 as required. Retrieval engine 206 could build a virtual table to aid in matching a series of data packets together pulling data from multiple places and combining them into a list of data sources.

Retrieval engine 206 could generally process the proprietary language query by listing, for example, the requested hour(s) (i.e., packets accumulated in files representing an hour's traffic). Retrieval engine 206 could then build a virtual table of data that matches the query request type from disparate data types and launch a different threat for each hour file. Next, retrieval engine 206 could wait for the threads to exit and then merge the result sets. Retrieval engine 206 could then call the virtual machine (described in later herein) for post processing. After the threads terminate, retrieval engine 206 could compile information related to each thread and pass the compiled information to virtual machine 108 to further process the compiled information and produce an output result set that could satisfy the original query request.

In one embodiment, as query engine 204 analyzes the proprietary query language to parse the query into appropriate query structures, query engine 204 could additionally make use of sub-structures. A sub-structure of the query proprietary language, generally called POST_PROCESS herein, could contain the actual program instructions for an embedded software computer known as virtual machine 108. Each POST_PROCESS instruction has six fields, "oper", "reg1", "fld1", "reg2", "fld2", and "val." Parser 202 examines the query and builds an appropriate program for virtual machine 108 to properly process the request. The "oper" field contains an integer value associated with virtual machine 108. Each value could relate to a specific instruction from virtual machine 108 with "reg1", "val1", "reg2", and "val2" as registers and values within the embedded software computer.

In one embodiment, virtual machine 108 could execute instructions to inputs from the input result set, output to the output result set, a number of arithmetic instructions, and a number of conditional branches based on arithmetic results. In one embodiment, virtual machine 108 could perform arithmetic instructions including, for example, immediate value load, add, subtract, multiply, divide, min, max, and standard deviation. One unique instruction, used only in lookup execution, could allow lookup of IP values in a specific index.

In one embodiment, virtual machine 108 could make use of a two-pass compiler and two runtime master loops, one with tracing and one without. Parser 102 writes a symbolic program in virtual machine's 108 native assembly language using integer values to represent operations, registers, and values. Virtual machine 108 could then convert the symbolic program into a form directly executable by virtual machine 108. Virtual machine 108 could include having access to an input result set, a general register file, and an output result set. The input result set and output result set contain a linked list of network packets.

A result set is generally a set of fields selected from the virtual table having actual data from each packet matching the selection criteria. An input packet could generally contain those fields selected from the virtual table of matching input packets. An output packet could, on the other hand, output the output result set and includes fields that could have been in an input packet or are values calculated by instructions from virtual machine 108.

In one embodiment, the general register file could have five registers, each with approximately thirty-five fields that correspond to all possible fields in network packet data 104. This could generally allow virtual machine 108 to store any data contained in packet data 104 as fields that are unassociated with the position in the actual packet by the number of registers the software is configurable to handle even larger data sets or made smaller to use less resources depending on the expected data. Accordingly, general register file generally acts as a general purpose register for virtual machine 108 to store data necessary for calculations such as counting, grouping, arithmetic operations, comparisons, etc.

In one embodiment, Register0 of the general register file could be mapped to the fields of the most recently used input data packets. For example, Register0 could contain the "next packet" after an input instruction has executed. The other four registers of the general register file could be groups of 32-bit integers, each having one per field. In one embodiment, virtual machine 108 could include a compiler that translates each of these integers into the corresponding function pointer within the host code.

In addition, virtual machine 108 could provide a "virtual machine instruction" (e.g., a 'C' programming function) that accepts two arguments, a pointer to the database packet post process structure and a pointer to the specific instruction (i.e., POST_PROCESS) being executed. These instructions could be called from a simple 'while' instruction and from a loop of instructions when tracing is invoked. Tracing provides high-level details of how the system is handling any given request and is useful for debugging or query optimization. In addition, special functions could be available to facilitate writing virtual instructions. The database packet post process structure could be built before compilation and could contain the original query, the program instructions, pointers to the input and output result sets, the register file, and numerous other counts and flags necessary for generating the result set as specified in the query.

In one embodiment, virtual machine 108 could include a compiler having two passes and output map building. The first pass could scan the source program and remembers each label instruction's number and program counter location. The second pass could convert the target field in each branch instruction to the real program counter location of the label. The output map-building phase could create a map from input packet fields to output packet fields to handle any combination of input fields to output fields depending on the requested input fields and output fields, without regards to sort order. In other words, any output field in the general and output registers could store any field including, for example, calculated fields or other virtual fields not actually in the packet.

In one embodiment, database management system 100 could include API configured to support client side "C", Perl-based applications, or any other application language. For example, in one embodiment, API could be contained in a single Perl module to interface with database management system 100. In one embodiment, API could be patterned after the database interface for Perl applications while still maintaining an interface for database management system. Using API, statements could be prepared and executed with arguments, and then records are fetched. However, unlike the conventional database interfaces, API could include connections that are not database specific. For example, any sensors associated with database server 106 could be queried with a single prepared statement.

Figure 3:
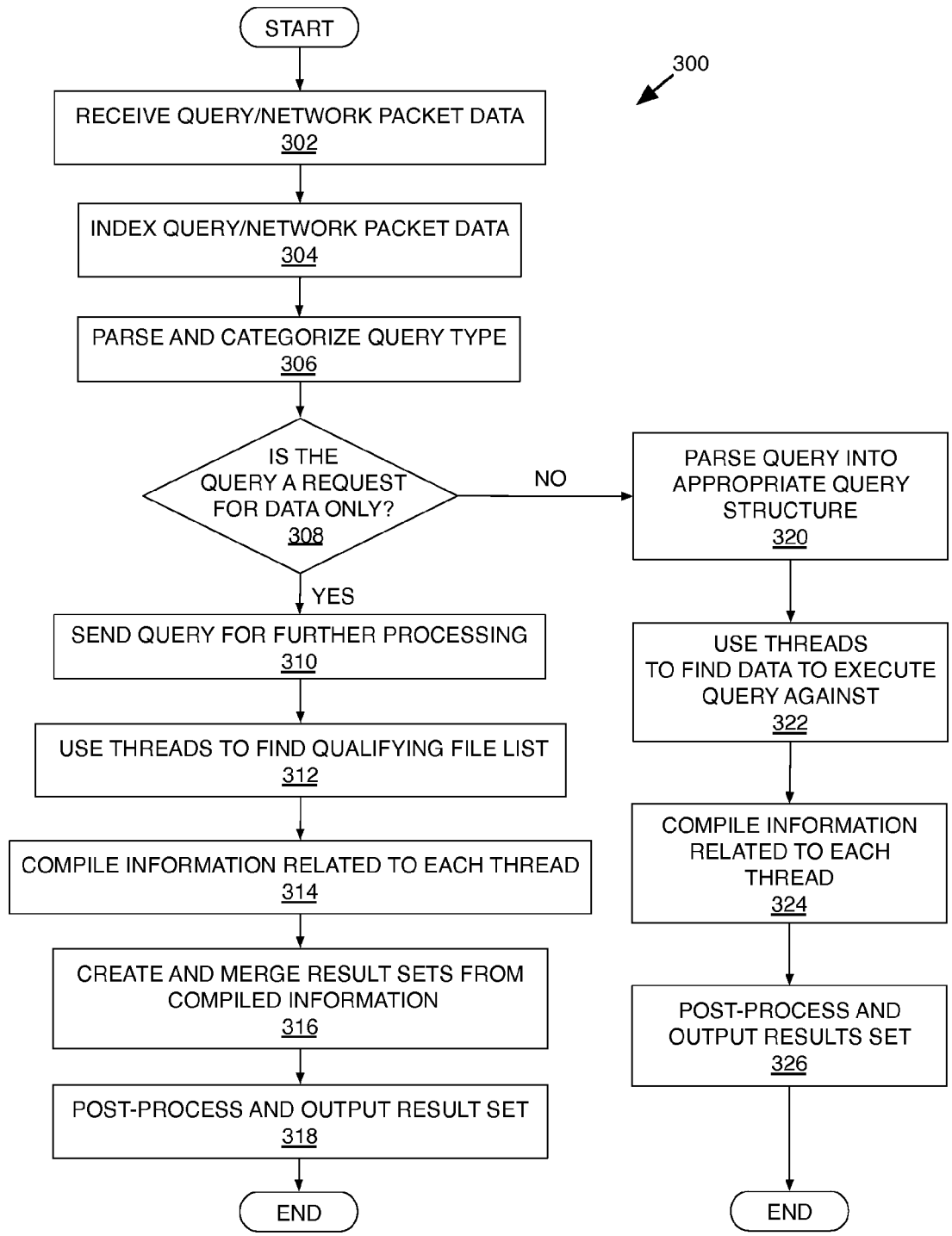
FIG. 3 is an exemplary illustration of a method of processing network packet data using the database management system according to one embodiment of the present disclosure.

FIG. 3 is an exemplary illustration of method 300 to process network packet data in the database management system 100 shown in FIG. 1 and using database server 106 and related systems shown in FIG. 2 according to one embodiment of the present disclosure. It should be understood that method 300 shown in FIG. 3 is for illustrative purposes only and that any other suitable method or sub-methods could be used in conjunction with or in lieu of method 300 according to one embodiment of the present disclosure.

Method 300 could include receiving a query in step 302. For example, database server 106 could receive a query (e.g., network packet data 104) from one of network resource objects 102 shown in FIG. 1. As described earlier, it should be understood that any suitable network packet data 104 including, for example, a binary network packet data according to one embodiment of the present disclosure.

In step 304, method 300 could initially index the query and store the native or original query and associated index for future use. For example, method 300 could use database server 106 and virtual machine 108 shown in FIG. 1 to initially index information associated with or related to the source of the query, the destination of the query, and the length or time of the query. The native or original query and the associated initial indexing set could be stored in or otherwise accessible from a virtual table accessible by data manager 208 shown in FIG. 2. In one embodiment, the indexes could aid in efficiently and easily analyzing, accessing, and retrieving the query from the virtual table accessible by data manager 208.

In step 306, method 300 could include passing the original query and the initial indexing set to a parser module for further processing. For example, the query tagged with the initial indexing set could be passed to parser 202 shown in FIG. 2 for further processing. Parser 202 could then write a symbolic program that, when compiled and executed by virtual machine 108 in step 322, uses the indices to find the best starting part in the packet data to eliminate as much stored data and, therefore, disk input/output (I/O), as possible.

In step 308, method 300 could include determining the type of query requested and what further processing could be required to carry out the query. For example, parser 202 could analyze the query and determine if the query is a data management query. If so, parser 202 passes the query to data manager 208 for further processing in step 310 according to one embodiment of the present disclosure. Otherwise, if the query is not a data management query, method 300 continues with step 320 described later herein.

Assuming that the query is a data management request, following step 310, method 300 could include further processing the query using a data manager module. In one embodiment, data manager module 208 shown in FIG. 2 could manage the query request and attempt to satisfy the query request.

In step 312, data manager module 208 could first use retrieval engine 206 shown in FIG. 2 to request a qualifying file list using customized threads. In one embodiment, the qualifying file list ideally should include all data files that potentially satisfy the query request. For example, retrieval engine 206 could search for different indexes associated with the query request by creating and using different threads, routines, or other computer programs to specifically search for particular indexes or types of data satisfying the query request. By running such threads, retrieval engine 206 could populate the qualifying file list from the disparate online data stores accordingly.

In step 314, retrieval engine 206 waits for the threads to terminate and compiles information related to each thread. Data manager 208 returns the required data, a list of files that match a certain data and time criteria, the name of the databases with the data store, or other data management information.

In step 316, method 300 could continue formatting the result set into a final result set by creating a virtual table containing the fields from data manager 208. In one embodiment, after the result sets are compiled, retrieval engine 206 merges the result sets into a single result set.

In step 318, method 300 could include post processing the result set to format it as specified by the original query. Method 300 could then analyze the input result set and produce an output result set to satisfy the original data manager query request received in step 302 and identified in step 308.

If, on the other hand, in step 308, parser 202 recognizes that the query is not simply a data manager query request but includes proprietary query language, the query is parsed further by query engine 204 in step 320. In one embodiment, query engine 204 could then parse the query into a particular query structure.

In step 322, method 300 continues by passing the query structures to retrieval engine 206, which in turn executes threads, routines, or other computer programs to specifically search for and identify data to execute the query against. Retrieval engine 206 first uses data manager 208 to compile a list of data files of packet data to use for the request using, for example, the date and time range specified in the query or a default if it is not present. Retrieval engine 206 then creates a thread for each data file that runs its own virtual machine 108 inside file processor 210. Virtual machine 108 uses the indices to find any starting data and process all of the packets, to map the results to an output, to perform any necessary calculations, to perform any post-processing, and to perform any groupings.

In step 324, in one embodiment, retrieval engine 206 waits for the threads to terminate and then compiles information related to each thread. In other words, retrieval engine 206 retrieves data from all threads by selecting the data in sort order from the thread data sets as specified by the original query from step 302. By selecting the data in sort order, retrieval engine 206 could avoid additional sorts and build a single result set automatically in sorted order.

In step 326, method 300 continues with virtual machine 108 post-processing the compiled information. Post-processing could include, for example, compiling and executing the symbolic program as programmed by parser 202. In addition, virtual machine 108 could retrieve and analyze the processed information and produces an output result set to satisfy the original query request received in step 302 and identified in step 308.

It should be understood that the steps included in method 300 either in its entirety, any individual step, series of steps, or set of steps could be repeated, performed in any order, or simultaneously performed according to one embodiment of the present disclosure.

Accordingly, embodiments of the present disclosure generally provide a database management system designed to execute searches over very large databases of static data quickly, while using minimum file storage or disk access. In one embodiment, the present disclosure is particularly applicable to network packet data collected on a computer network.

It should be understood, however, that although applications of the present disclosure employ a database management system to speed processing of network packet data, embodiments of the present disclosure could be used to increase execution times in any other application having voluminous data stored within a database of disparate data. For example, embodiments of the present disclosure could be used in a variety of applications involving network security, e-commerce transactions, identity verification transactions, credit card transactions, and the like.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
receiving a plurality of data packages at one or more hardware database servers, each of the plurality of data packages including a plurality of packets;
receiving a query that includes one or more selection criteria;
indexing the query to generate an initial indexing set;
creating, using the one or more hardware database servers, one or more lists of one or more packets for each of the plurality of data packages, the one or more lists configured to index a sequence of packets within each of the plurality of data packages by source address information and destination address information, the one or more lists indicating, for each of the plurality of data packages, an offset of each of: (a) a first packet and a last packet in the sequence that contains given source address information, and (b) a first packet and a last packet in the sequence that contains given destination address information, the one or more lists further configured to allow the one or more hardware database servers to bypass packets within each of the plurality of data packages during execution of the query using one or more of the offsets, each of the offsets provided as a number of bytes;
storing both the query and the initial indexing set;
passing both the query and the initial indexing set to a parser to generate a symbolic program;
compiling and executing the symbolic program to retrieve, by the one or more hardware database servers and based at least in part upon the one or more lists, one or more packets that satisfy the query, wherein retrieving the one or more packets includes executing a plurality of threads to satisfy the query;
creating a table, using the one or more hardware database servers, that includes data from each retrieved packet matching the one or more selection criteria; and
combining results from the plurality of threads to generate a final result of the query.

2. The method of claim 1, wherein the packets within each of the plurality of data packages are stored in a sequence according to an order of their arrival at a respective network device.

3. A system, comprising: a hardware database server, the hardware database server configured to:
store a plurality of data packages, each of the plurality of data packages including a sequence of packets;
receive a query, the query including selection criteria;
index the query to generate an initial indexing set;
storing both the query and the initial indexing set;
create one or more lists of one or more packets for each of the plurality of data packages, the one or more lists configured to index a sequence of packets within each of the plurality of data packages by source address information and destination address information, the one or more lists indicating, for each of the plurality of data packages, an offset of each of: (a) a first packet and a last packet in the sequence that contains given source address information, and (b) a first packet and a last packet in the sequence that contains given destination address information, the one or more lists further configured to allow the one or more hardware database servers to bypass packets within each of the plurality of data packages during execution of the query using one or more of the offsets, each of the offsets provided as a number of bytes;

pass both the query and the initial indexing set to a parser to generate a symbolic program;

compile and execute the symbolic program to retrieve, by the one or more hardware database servers and based at least in part upon the one or more lists, one or more packets that satisfy the query, wherein retrieving the one or more packets includes executing a plurality of threads to satisfy the query;

create a table, using the one or more hardware database servers, that includes data from each retrieved packet matching the one or more selection criteria; and combine results from each of the plurality of threads to generate a final result of the query.

4. The system of claim 3, wherein the packets in each of the plurality of data packages are stored in order of their arrival at a respective network device.

5. The system of claim 4, the hardware database server further configured to: launch a separate thread for each of the plurality of data packages, each of the separate threads configured to execute the query with respect to each corresponding data package using an indexed list, the indexed list indexing the sequence of packets within each of the plurality of data packages by at least one of: source address or destination address, the indexed list including, for each of the at least one of the source address or destination address, an offset, configured to enable each of the separate threads to bypass as many packets as possible that do not match the selection criteria within a respective data package;

wherein, for each of the plurality of data packages, the indexed list includes the offsets of a first packet in the sequence that contains a given source address and of a last packet in the sequence that contains the given source address.

6. The system of claim 5, wherein, for each of the plurality of data packages, the indexed list includes the offsets of a first packet in the sequence that contains a given destination address and of a last packet in the sequence that contains the given destination address.

7. The system of claim 5, wherein each of the plurality of data packages includes packets of disparate data types.

8. The system of claim 7, wherein the indexed list includes data contained in a given packet as fields in positions that are unassociated with their actual positions in the given packet.

9. The method of claim 1, wherein combining the query results includes creating a table that excludes fields of packets that are not responsive to the query.

10. The method of claim 1, wherein the one or more selection criteria include a requested time, the method further comprising:

selecting data packages corresponding to the requested time; and launching by the plurality of threads for the selected data packages.

11. The method of claim 10, wherein each of the data packages corresponds to an hour's traffic, the method further comprising, in response to the requested time being greater than one hour, selecting two or more data packages from different network devices.

* * * * *